April 11, 1950           W. S. DIEHL           2,503,249
ANGLE OF ATTACK INDICATOR
Filed March 30, 1945
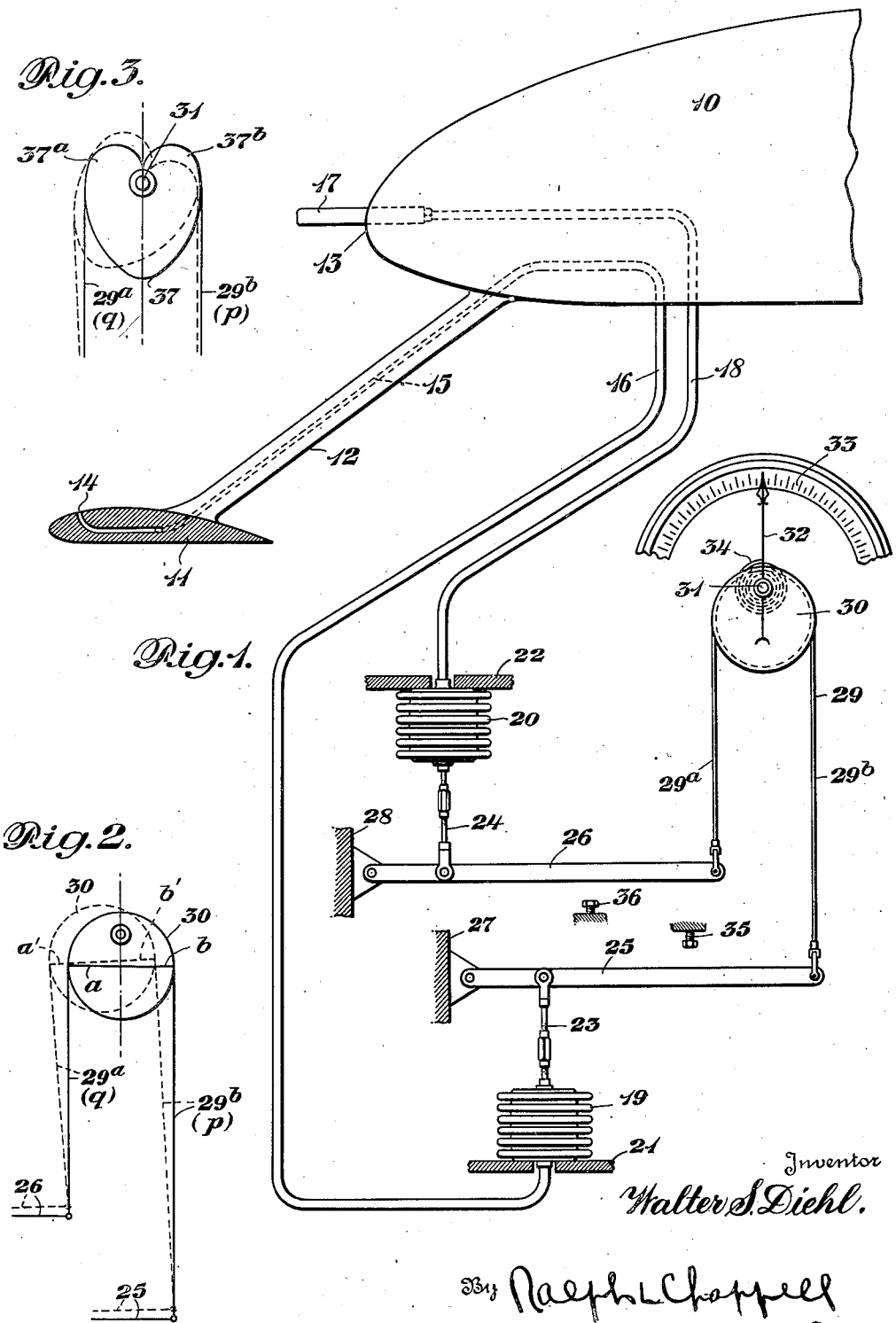
Inventor
Walter S. Diehl
By Ralph L. Chappell
Attorney Patented Apr. 11, 1950

2,503,249

UNITED STATES PATENT OFFICE 2,503,249

ANGLE OF ATTACK INDICATOR

Walter S. Diehl, United States Navy

Application March 30, 1945, Serial No. 585,754

6 Claims. (Cl. 73—180)

(Granted under the act of March 3, 1883, as amended April 30, 1928; 370 O. G. 757)

The present invention relates to new and useful improvements in pressure responsive instruments and more particularly to new and useful improvements in an instrument for indicating the relative angular position of an airplane by effecting the relative measurement of certain forces acting on some part or parts of an airplane during flight, such as on an airfoil.

More specifically, the invention contemplates the provision of an instrument for measuring and indicating the angle of attack of an airplane. Angle of attack may be defined as the acute angle between an arbitrary reference line in the airplane (usually a line through an airfoil touching it at two points) and a line representing the direction of relative wind projected on a vertical plane containing the reference line and parallel to the plane of symmetry. Indication of the angle of attack is of importance as a safety or warning measure in maneuvering an airplane in order to show the existence of or approach to conditions of flight under which stalling will or may occur and under present conditions of aircraft use, its importance is increasing.

The upper surface of an airplane wing or other airfoil is normally subjected to a reduced local pressure in the nature of a "suction" when considered in relation to atmospheric pressure although at large negative angles of attack, this pressure may become positive. This local pressure is a function of both angle of attack and airspeed and is substantially independent of Reynolds number although it may be affected by compressibility at high speeds. The change in local pressure due to change in airspeed can be eliminated by the use of pressure ratios since the ratio of local pressure $p$ to the dynamic pressure $q$ is, within broad limits, a function of angle of attack only. The dynamic pressure is defined as $q=\frac{1}{2}\rho V^2$ where $\rho$ is the air density and V is the airspeed. The dynamic pressure $q$ is used in measuring airspeed and it is the quantity picked up by the Pitot tube or airspeed head. It is also the pressure built up on the leading edge of a wing or other airfoil. Pressure distribution data are available on various airfoil sections in the form of plots of the ratio of $p/q$ at various angles of attack. The local pressure $p$ on the upper surface of a wing is normally a negative increment and the impact pressure $q$ is always a positive increment. While the variation of the force $p$ with airspeed has made it difficult to utilize $p$ alone as a measure of the angle of attack, the ratio of $p$ to $q$ can be employed as such a measure. It is merely necessary to so balance the pressures, one a positive increment $q$ and the other normally a negative increment $p$, against each other as to indicate the ratio of $p$ to $q$ on an arbitrary scale calibrated to indicate angle of attack directly in degrees.

With the above in mind, one of the principal objects of the present invention is to effect measurement of angle of attack or the like in an extremely simple and sufficiently accurate manner.

Another object of the present invention is to provide a simple and accurate device for balancing differential pressures according to the ratio thereof and to indicate such balanced pressures against a scale selected arbitrarily for the particular use to which the device is to be applied.

A further object of the invention is to provide a device of the above type wherein the balancing of pressures is accomplished by means operable to provide equilibrium between moments of force exerted thereon by the pressures.

A still further object of the invention is to provide a device of the above type wherein the balancing of pressures is effected by rotatable means acted on by the pressures at variable effective distances from its pivot.

The invention still further aims to provide a device of the above type having a member rotatably mounted off center on a fixed pivot in such a manner that changed positions thereof will effect balancing of the pressures by establishing varying equilibrium of moments.

The above and other objects of the invention will in part be obvious and will be hereinafter more fully pointed out.

In the accompanying drawings:

Fig. 1 is a fragmentary diagrammatic view schematically illustrating the present invention.

Fig. 2 is a diagrammatic view showing various positions of the pressure balancing means.

Fig. 3 is a diagrammatic view showing a modified form of pressure balancing means.

Referring more in detail to the accompanying drawings and particularly to the fragmentary and schematic showing of Fig. 1 thereof, a portion of an airplane wing structure 10 is illustrated. An independent airfoil 11 in the nature of a miniature wing is positioned by a strut 12 at a location below and somewhat in advance of the leading edge 13 of the main wing structure 10. The airfoil 11 is provided with a fluid passage 14 therethrough which is open to the atmosphere at a point on the upper surface thereof and which communicates with a passage 15 through the strut 12. The open end of the passage 14 is located on the airfoil at a point to normally induce a negative pressure or suction therein within the useful range contemplated. The passage 15, in turn, is connected to a fluid pressure line 16 which leads to the instrument casing or housing (not shown) suitably mounted on the instrument panel or other suitable location. At the leading edge 13 of the main wing 10, there is mounted a Pitot tube 17 or other suitable impact head for measuring dynamic impact pressure at the leading edge. The Pitot tube is connected to a fluid pressure line 18 which also leads to the instrument casing (not shown).

Two pressure responsive devices 19, 20 are diagrammatically shown in Fig. 1 as being mounted on supporting structures 21, 22, respectively. It is to be understood that the structures presently described and illustrated more or less diagrammatically, are adapted to be enclosed within a suitable instrument casing. The pressure responsive devices are illustrated as being in the form of resilient bellows compartments but any other suitable type of pressure responsive devices may obviously be employed. The compartments 19, 20 have bellows type walls forming expansible and contractible chambers which are in communication with the pressure lines 15, 18, respectively. Thus, the pressures induced in the pressure lines actuate the respective bellows according to variations in the pressures set up in the respective pressure lines.

The dynamic impact pressure set up in the Pitot tube is transmitted through the pressure line 18 to the bellows 20 so that the chamber will tend to expand and contract according to the pressure variations at the Pitot. Similarly, at normal angles of attack, a reduced pressure or suction is set up in the passage 15 and is transmitted through the pressure line 16 to the bellows 19. The pressure induced in the line 16 is normally in the nature of a "suction" when considered in relation to atmospheric pressure. Thus, the bellows 19 will normally tend to remain in varying contracted positions during flight. In other words, from a predetermined set or neutral position, the bellows 19, being subject to atmospheric pressure when the airplane is grounded, is subjected to a reduced or sub-atmospheric pressure during normal flight (not at extreme negative angles of attack) so that a suction effect is developed in the pressure line 16 and the bellows.

For purposes of illustration, an extremely simple form of operating connection between the pressure responsive devices 19, 20, and an indicator arm has been shown diagrammatically in Fig. 1, but it is to be clearly understood that various forms of such connections may be utilized. However, for purposes of illustration, as above indicated, the bellows 19, 20 may be connected by adjustable links 23, 24, respectively, to equal levers 25, 26, respectively, each of which is pivoted at one end thereof to suitable supports 27, 28, respectively. The opposite ends of the levers are connected to opposite ends of a cable 29 which is trained over a grooved disk, drum or pulley 30 eccentrically mounted on a pivot shaft 31. The indicator arm 32 is illustrated as being mounted on the shaft 31 for movement over the face of the dial 33. However, suitable gearing may be employed with the shaft for moving the arm if desired. Operation of the device will be hereinafter described but it is hereby pointed out and emphasized that other equivalent means may be substituted for the lever and link arrangement. The illustrated form of the invention is not to be considered as in any way limiting but merely for illustrative purposes.

A coil spring 34 may be connected to the shaft 31 and to the indicator arm or to the disk for dampening excessive relative movements between the operating parts, thus serving in the manner of a dash-pot arrangement. Similarly, adjustable stops 35, 36 may be provided for limiting excessive motion of the levers 25, 26, respectively. From the neutral position of the various parts, as shown in Fig. 1, relative pressures will be developed in the pressure lines as the airplane proceeds in flight. The dynamic pressure variation at the Pitot with changes in the angle of attack will normally be less than that of the reduced pressure or "suction" pull at the port 14, so that variations in the differential between the pressures in the pressure lines 16 and 18 result in accordance with changes in the angle of attack. As previously pointed out, the ratio between these pressures is constant at any given angle of attack for any speed and for a given lift coefficient of the airplane in flight; and if the system of levers is balanced at any ratio of these pressures, the position of the disk 30 will have correspondingly positioned the indicator arm 32 to indicate the desired measurement of the angle of attack according to the relative position of the airplane with respect to its line of motion through the air. As the position of the airplane, as well as the forces acting thereon, change, the ratio of the relative pressures will change.

When the local pressure $p$ (or suction) increases, the lever 25 will be shifted in a clockwise direction (as viewed in Fig. 1) under the influence of the contracting bellows 19. This will tend to rotate the disk 30 in a clockwise direction. As diagrammatically shown in Fig. 2 of the accompanying drawings, the eccentric mounting of the disk 30 provides an arrangement whereby changes in the angular position of the disk about the shaft 31 will vary the effective moments of force exerted at opposed points of contact between the cable runs and the disk. Thus, in the neutral or zero setting, the chord or diameter between the points of tangent contact between the disk 30 and the cable runs 29a, 29b may be considered as divided into two equal sections $a$ and $b$ by a line or plane at right angles to the chord and passing through the longitudinal center axis of the shaft 31. At the zero setting, the equal forces of $p$ and $q$ at atmospheric pressure act on equal chord sections which thus operate in the nature of equal lever or moment arms. As the force exerted by $p$ increases to an amount designated by $p'$ assuming that $q$ remains substantially constant, the disk 30 will be angularly moved in a clockwise direction until it reaches a new balanced position wherein the force $p'$ exerts its turning effort through the chord section $b'$ which is shorter than the previous chord length $b$. Similarly, the force $q$ acts through the chord section $a'$ which is longer than the previous chord section $a$. The disk will thus reach a new position of balance and the indicator arm will be moved to indicate the new ratio of pressures. In operation, variations in the pressure $p$ will usually be accompanied by changes in the pressure $q$; hence the disk will rotate until it reaches a momentary balanced position according to the ratio of $p/q$ and the indicator arm will be correspondingly moved to give the correct reading on the dial. Further increase in the force of $p$ will result in continued angular movement of the disk in a clockwise direction to another position of balance. The same action in reverse will occur as the disk is turned in the opposite direction. Thus, as the angle of attack of the airplane changes, the ratio between the impact and reduced pressure changes and the disk will be shifted to balance the differential pressures and the indicator arm will be similarly moved relative to the dial so as to indicate the momentary measurement of the relative angular disposition of the airplane. The chord sections of the disk may be considered as variable radii acting as lever arms.

Usually, the extreme useful range of $p/q$ values would be between $-0.2$ and $-5.0$ so that the extreme eccentricity of the cam would be five to one (5:1). This will be the extreme ratio of the long to the short radius of the cam and the eccentrically mounted disk. Rotation of the pulley or eccentric disk, as illustrated, through 180 degrees will change the ratio of the radii from one fifth to five or vice versa but any convenient shaping or mounting of the pulley or disk may be selected to reduce this angle so as to prevent extreme positions of balance from approaching conditions of unstable equilibrium.

A further indication of the various ways of effecting operation of the device, reference is made to Fig. 3 wherein lobed means is employed in place of the eccentrically mounted disk. A double lobed pulley 37 has opposite lobe surfaces 37a, 37b arranged so that increase in force $p$ on the cable run 29b will rotate the pulley from neutral position in a clockwise direction, thus shortening the effective radius arm, as explained in connection with Fig. 1 and as illustrated by the dotted line position of Fig. 3. Similarly, the force $q$ acting through the cable run 29a will then act on a longer effective radius arm. Thus, the differential pressures are balanced in the manner previously explained and the indicator arm will be similarly shifted relative to the dial face. With a cam of this type, perhaps a more accurate measurement can be obtained by a precise shaping of the cam surfaces according to minute previously calculated relative angular positions of the airplane.

It will thus be seen that the angular position of the pulley or eccentric is a function of the ratio of the pressures in the pressure responsive elements and the angular position of the pulley or eccentric will, in effect, supply the moment arm ratio required to vary the angular position to momentary and variable positions of balanced equilibrium. Thus the ratio of $p$ to $q$ is effectively measured.

While certain forms of the invention have been shown more or less diagrammatically for purposes of clearly indicating the fundamental features and operation of the invention, it is to be clearly understood that various changes in the details of construction and arrangement of parts may be made without departing from the spirit and scope of the invention as set forth in the appended claims.

The invention described herein may be manufactured and used by or for the Government of the United States of America for governmental purposes without the payment of any royalties thereon or therefor.

What I claim is:

1. An angle of attack indicator for aircraft, comprising a pair of pressure lines open to the atmosphere at points on the aircraft to induce relatively different pressures therein having a ratio proportional to the angle of attack independent of air speed, a pair of pressure responsive devices one connected to each of said pressure lines, an indicator calibrated according to said ratio, and variable lever means between said pressure responsive devices for balancing said pressures against each other and directly connected to operate said indicator whereby to actuate the indicator according to their momentary lever ratio.

2. An indicator for measuring the angle of attack for aircraft, comprising a pair of pressure lines open to the atmosphere at such points on the aircraft surfaces as to induce relatively high and low pressures therein, a pair of pressure responsive devices one connected to each of said pressure lines, an indicator calibrated in degrees of angle of attack, and operating mechanism for said indicator including opposed lever arms of variable effective length connected respectively to said pressure responsive devices and operating to balance said pressures whereby to actuate the indicator according to momentary balanced pressure differences in said pressure lines.

3. An angle of attack indicator for aircraft, comprising airfoil means having ports arranged to be subjected to impact and local pressures, expansible and contractible devices responsive to pressures at said ports, and means connected to said devices for indicating angle of attack and including mechanism for automatically varying the moment arms to which the pressures are applied in opposite rotational directions about a fulcrum, operating to shift the indicator pointer.

4. An angle of attack indicator for aircraft, comprising airfoil means having ports arranged to be subject to impact and local pressures, expansible and contractible devices responsive to pressures at said ports, and means connected to said devices for indicating angle of attack and including a lobed pulley presenting a variable lobe surface for balancing the pressures against each other by varying the ratio of their respective lever arms inversely with respect to the ratio of said pressures.

5. An angle of attack indicator for aircraft, comprising airfoil means having ports arranged to be subjected to impact and local pressures, expansible and contractible devices responsive to pressures at said ports, and means connected to said devices for indicating angle of attack and including an eccentric, a cord passed around said eccentric having its ends connected to said pressure responsive devices for providing a variable lever for balancing the pressures against each other according to the ratio of said pressures.

6. An indicator for measuring the angle of attack for aircraft, comprising a pair of pressure lines open to the atmosphere at such points on the aircraft surfaces as to induce relative pressures therein, a pair of pressure responsive devices one connected to each of said pressure lines, and indicator graduated in degrees of angle of attack and mechanism connected to said pressure responsive devices and to said indicator for operating the said indicator and including an oscillatable pulley eccentrically mounted to present variable effective moment arms to the forces exerted thereon by said pressure responsive devices whereby to actuate said indicator according to the pressure balancing position of said oscillatable pulley.

WALTER S. DIEHL.

(References on following page)

REFERENCES CITED

The following references are of record in the file of this patent:

UNITED STATES PATENTS

| Number | Name | Date |
|---|---|---|
| 392,995 | Deike | Nov. 20, 1888 |
| 1,133,556 | Gerdien | Mar. 30, 1915 |
| 1,140,825 | Hopkinson | May 25, 1915 |
| 2,352,312 | Donaldson | June 27, 1944 |
| 2,352,955 | Johnson | July 4, 1944 |

FOREIGN PATENTS

| Number | Country | Date |
|---|---|---|
| 419,522 | France | Oct. 27, 1910 |
| 649,148 | France | Aug. 21, 1928 |
| 256,275 | Great Britain | Mar. 10, 1927 |